Oct. 31, 1939.　　E. G. CAMPBELL ET AL　　2,178,278
METER BAR
Filed Aug. 15, 1938　　3 Sheets-Sheet 2
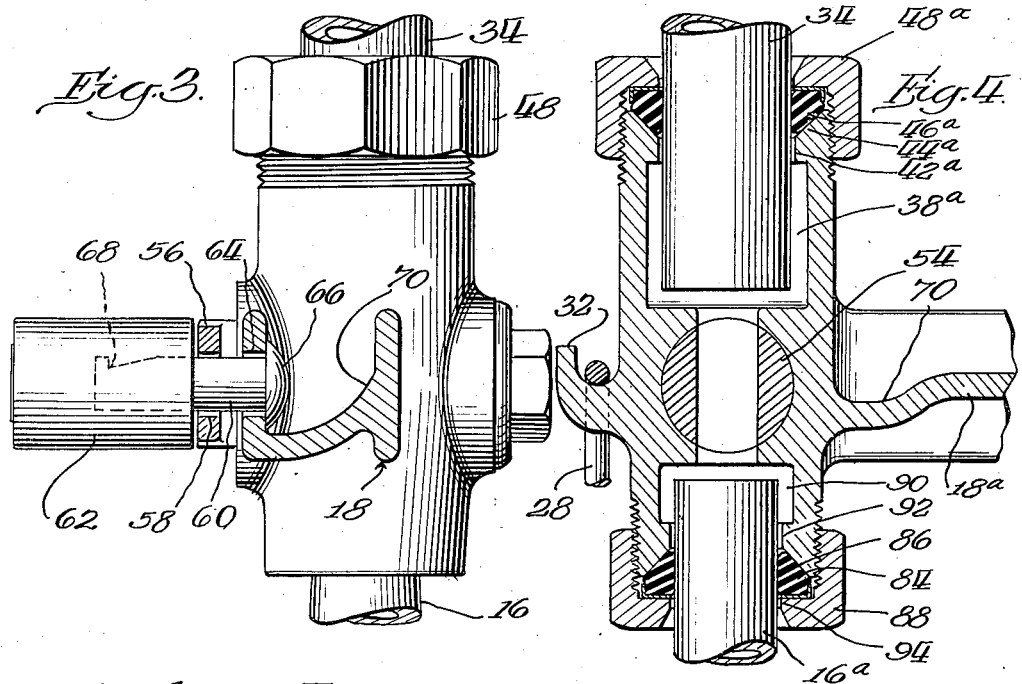
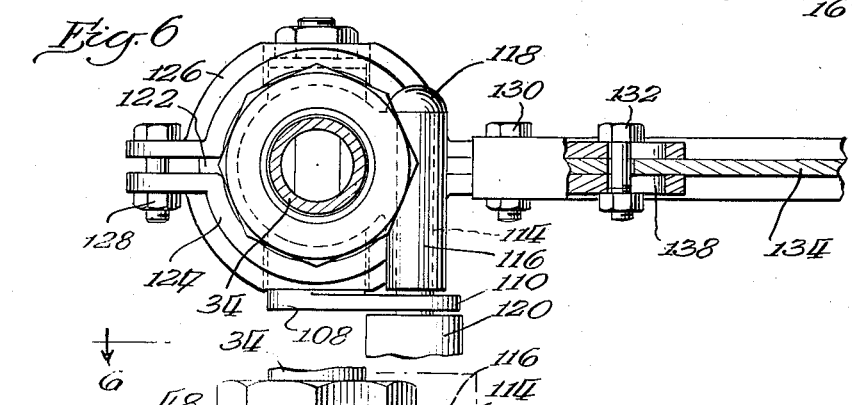
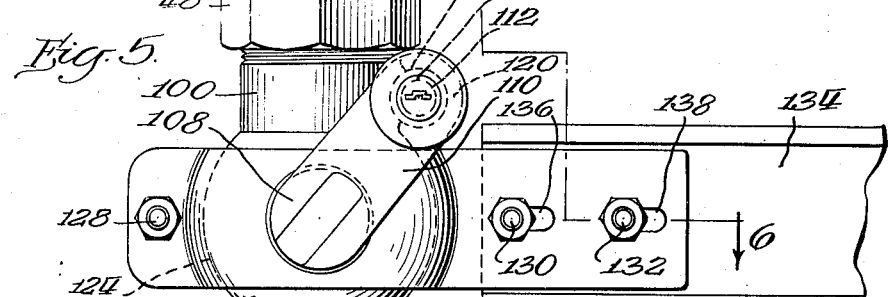
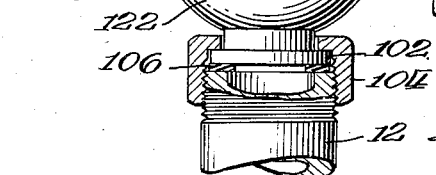
Inventors
Ernest G. Campbell
Charles E. Norton
By Williams, Bradbury, McCaleb & Hinkle
Attys.

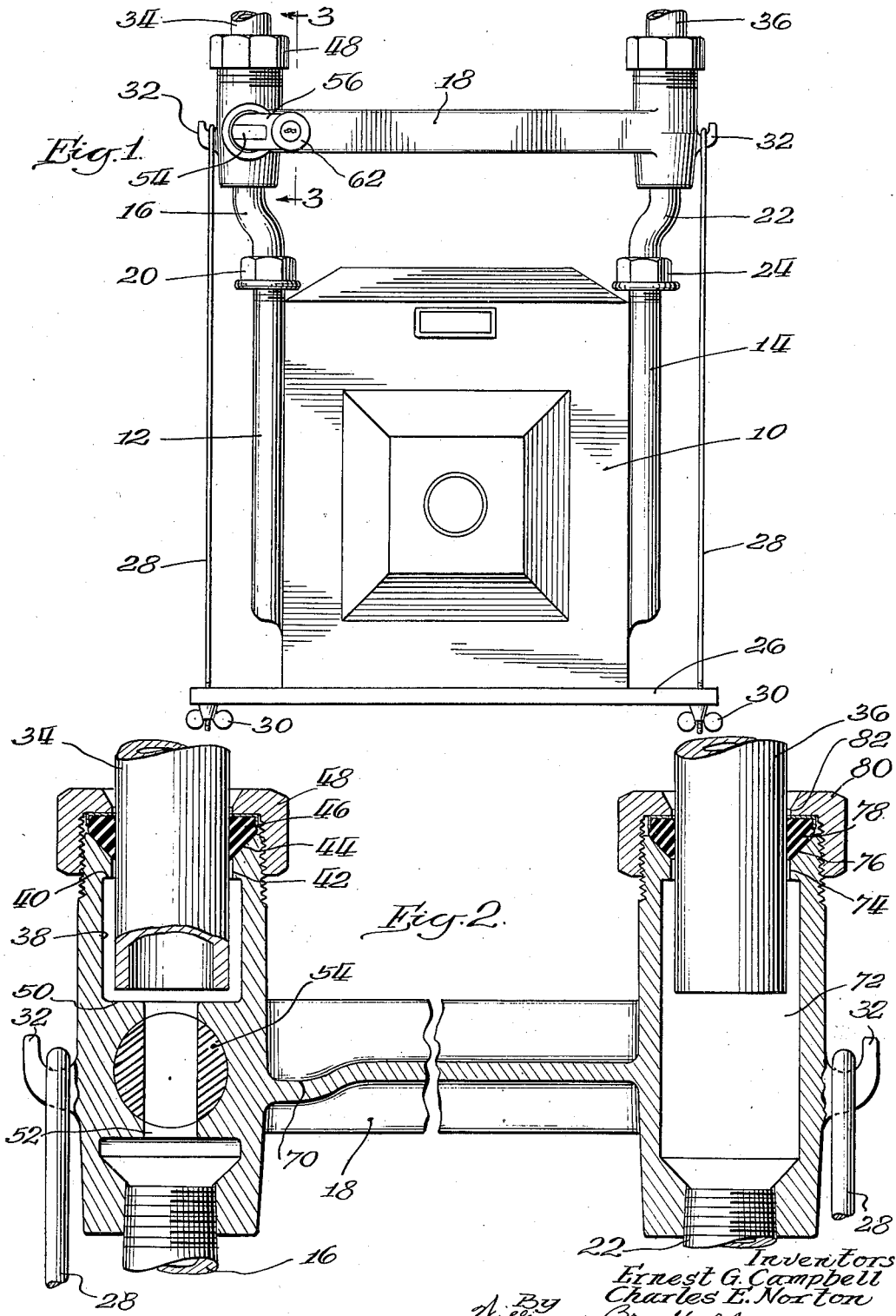

Oct. 31, 1939.  E. G. CAMPBELL ET AL  2,178,278
METER BAR
Filed Aug. 15, 1938  3 Sheets-Sheet 3
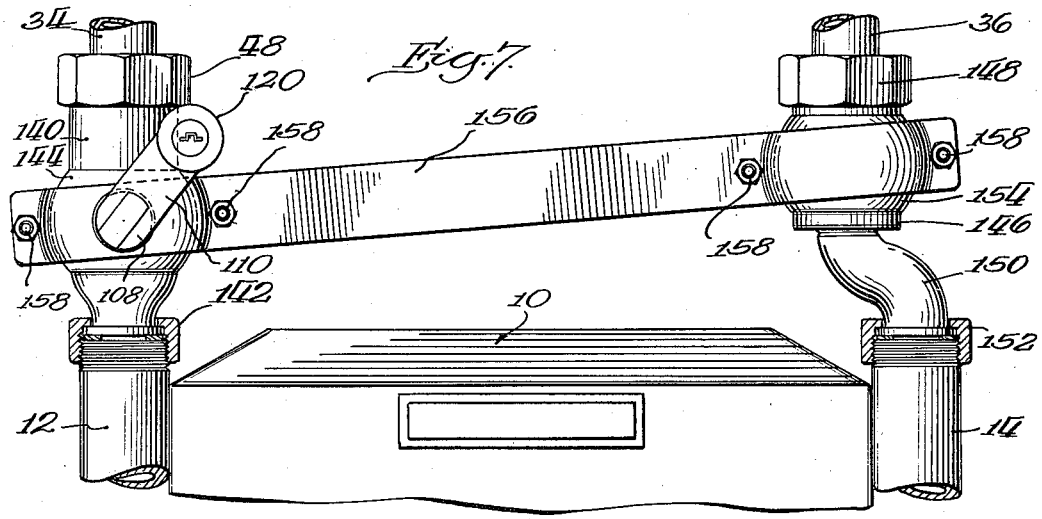
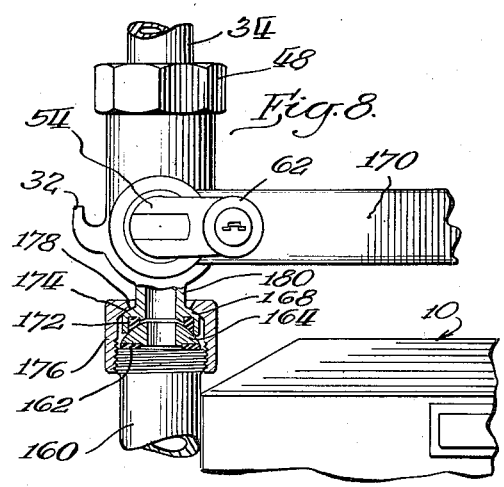
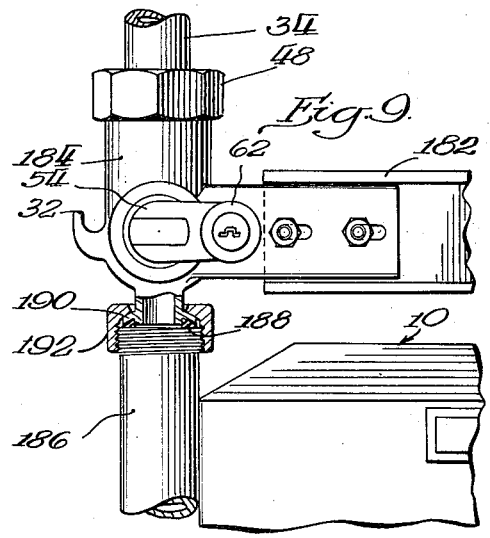
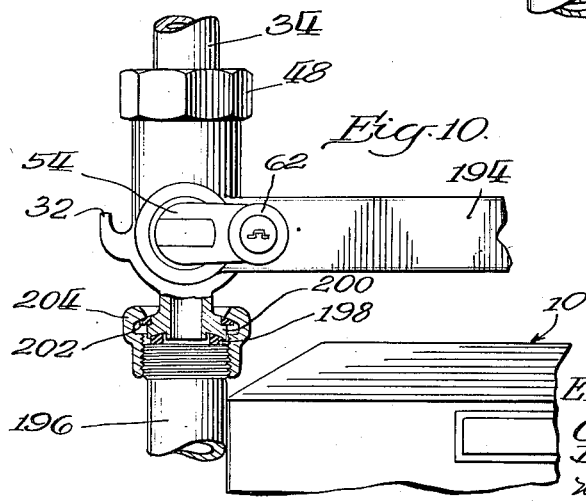
Inventors.
Ernest G. Campbell
Charles E. Norton Patented Oct. 31, 1939

2,178,278

UNITED STATES PATENT OFFICE 2,178,278

METER BAR

Ernest G. Campbell and Charles E. Norton, Chicago, Ill., assignors to Norton-McMurray Manufacturing Company, Chicago, Ill., a corporation of Illinois Application August 15, 1938, Serial No. 224,860

1 Claim. (Cl. 285—3)

Our invention relates to meter bars and more particularly to meter bars to be used in connection with gas meters for measuring the quantities of gas supplied to homes, stores and office buildings to operate the gas appliances thereof.

The gas meter now in universal use for this purpose consists of a frail tin box containing the measuring instrument and a pair of side pipes adapted to be connected respectively to the gas service main through which the gas is supplied to the building and the house pipe leading to the gas appliances. These side pipes extend upwardly along opposite sides of the box and are attached thereto by soldering riveting, or any other suitable manner.

Because of the frailty of the conventional gas meter and the necessity for protecting the side pipes thereof against twisting or any strains which would tend to separate them from the box, it is customary to interpose a meter bar between the gas meter on the one hand, and the service and the house pipe on the other. This meter bar consists of a strong rigid bar having a conduit formed in each end thereof. One end of each conduit is attached to each side pipe by means of an offset swivel which can be rotated so that the ends of the swivels which are attached to the side pipes will have identically the same spacing as the side pipes of the meter. One end of one conduit in the meter bar is attached to the service pipe and one end of the other conduit in the meter bar is attached to the house pipe. In present practice all of the connections between the meter bar, service pipe, house pipe, and side pipes of the gas meter are effected through conventional threaded connections.

The conventional gas meter is a sensitive instrument which will only measure properly when the base of the meter is horizontal. In present practice it is only rarely that the base of the meter is truly horizontal because of the variations in the threaded connections whereby the gas meter is attached to the service and house pipes with the result that many gas meters give inaccurate readings as a result of their improper installation.

The conventional gas meter is also easily injured by shocks or vibration. In the larger cities where the gas meters are installed in stores or other business buildings, it is not uncommon to locate the gas meter close to the street or sometimes in a cellar which is under the sidewalk or even under the roadway itself in some instances. In these locations, under the prevailing practice, all shocks and jars occasioned by the passing of trucks and other heavy vehicles are transmitted to the gas meter through the service pipe with resultant injury to the gas meter or distortion of its readings.

Another difficulty experienced in the conventional gas meter installation arises from the fact that the service pipe expands or contracts with seasonal variations in temperature, thereby shifting the relationship between the end of the service pipe and the house pipe. This imposes a tremendous strain upon the threaded connections between these pipes and the meter bar, with the result that the threaded ends of one or the other of these pipes frequently breaks at the base of the threads.

An object of our invention is to provide a meter bar which will overcome the foregoing defects.

Another object of our invention is to provide a meter bar which may be more easily and quickly installed than the meter bars now on the market.

Another object of our invention is to provide a meter bar which will make it possible readily to position the gas meter with its base in a horizontal position.

Another object of our invention is to provide a meter bar which will protect the gas meter against shocks and jars.

Another object of our invention is to provide a meter bar which will compensate for relative movement between the ends of the service pipe and the house pipe.

Another object of our invention is to provide a meter bar which will permit the use of a cheaper padlock than has heretofore been used to lock the gas supply valve in position.

Another object of our invention is to provide a meter bar which will make the application of the padlock to the gas supply valve thereof quicker and more easily effected.

Other objects and advantages will become apparent as the description proceeds.

In the drawings,

Figure 1 is a view showing a gas meter installation embodying our invention;

Figure 2 is a vertical sectional view of the meter bar shown in Figure 1;

Figure 3 is a vertical sectional view taken on the line 3—3 of Figure 1;

Figure 4 is a vertical sectional view through a valve end of a meter bar illustrating a modified form of our invention;

Figure 5 is an elevational view of a further modification of our invention;

Figure 6 is a top plan view of the modification shown in Figure 5, parts being cut away to illustrate more clearly the mechanism for adjusting the length of the meter bar;

Figure 7 is an elevational view of a further modification, parts being shown in section to indicate the manner in which the meter bar is connected to the side pipes of the meter; and Figures 8, 9 and 10 are elevational views of further modifications. Each of these views shows parts cut away to indicate the swivel connections between the meter bar and the meter side pipes.

Referring to Figure 1 of the drawings, we have shown a conventional gas meter 10 having an inlet side pipe 12 and an outlet side pipe 14. A bent pipe 16 is threaded into the lower part of the left-hand end of the meter bar 18 as is more clearly shown in Figure 2. The lower end of the bent pipe 16 is attached to the side pipe 12 by a swivel connection including a swivel nut 20. A second bent pipe 22 and swivel nut 24 connect the other side pipe 14 to the other end of the meter bar 18.

The connections between the side pipes 12 and 14 of the gas meter 10 and the meter bar 18 are usually relied upon to support the gas meter. In some instances, it is found desirable, however, to provide a shelf similar to the shelf 26 on which the base of the gas meter may rest. This shelf is suspended from the ends of the meter bar by rods 28 provided with wing nuts 30 and hanging from fingers 32 which form an integral part of the meter bar 18.

The meter bar 18 in turn is attached to and suspended from the service pipe 34 and the house pipe 36 and an important feature of our invention lies in the particular manner in which the meter bar is attached to these pipes. Referring particularly to Figure 2, it will be seen that the left-hand end of the meter bar is provided with a recess 38 into which one end of the service pipe 34 extends, the recess 38 being of materially larger diameter than the service pipe 34. At the upper end of the recess 38 there is a shoulder 40 and bore 42. The bore 2 is of smaller diameter than the recess 38 but is larger than the diameter of the pipe 34. It is to be noted that the bore 42 is relatively short.

A tapered surface 44 merges with bore 42 and serves as a seat for a rubber gasket 46 which is pressed thereagainst by a tubular nut 48 threadedly secured to the adjacent part of the bar 18. The opening in the tubular nut 48 is also larger than the diameter of the pipe 34 so that the only part of the entire assembly which engages the outer surface of this pipe is the rubber gasket 46. This is important since it permits angular movement between the pipe 34 and bar 18.

The lower end of the recess 38 terminates in a shoulder 50, and a duct 52 connects the recess 38 with the bent pipe 16. The duct 52 is controlled by a rotary valve 54 having an arm 56 providing an opening 58 for receiving the bolt 60 of a padlock 62. The bolt 60 also extends through the opening 64 provided by a web of the bar 18, the opening 64 being too small to permit the passage of the bolt head 66 therethrough. The other end of the bolt is provided with a notch 68 adapted to be engaged by gripping mechanism contained in the body of the padlock 62.

In the past it has been the practice to lock the arm of the valve member to a boss of the meter bar by means of a U-shaped bolt forming the locking member of the padlock. Padlocks with U-shaped bolts are objectionable in that they are costly and also because it is difficult to insert the U-shaped bolt in place and attach the padlock thereto where the gas meter is installed in a relatively inaccessible place and above the height of a man's head as is frequently the case.

Our invention is a material advance in this respect, since it utilizes a padlock having a pin type instead of a U-shaped bolt, with the result that the cost of the padlock is materially reduced. Furthermore, the pin type bolt can be inserted and the padlock attached thereto with one hand, whereas two hands were required by the prior art. The pin type bolt is first inserted in the holes 64 and 58, whereupon the bolt 60 may be released and will remain in place. The same hand can then be used to attach the padlock 62 to the bolt 60 while the other hand is used for holding on to an adjacent object to steady the man who is applying the padlock. When pressure is exerted on the padlock to cause it to engage and grip the bolt 60, the head 66 of the bolt is pushed against the portion 70 of the web of the meter bar, whereby the portion 70 retains the bolt in padlock engaging position.

The right-hand end of the meter bar 18 is shown most clearly in Figure 2 and provides a recess into which one end of the house pipe 36 projects. This recess 72, like the recess 38, is materially larger than the outide diameter of the pipe. Likewise, the bore 74 is somewhat larger than the pipe 36 and in this respect corresponds to the bore 42. The tapered surface 76 forms a seat for a rubber gasket 78 which is pressed against the seat 76 and pipe 36 by the tubular nut 80 having an opening 82 of larger diameter than the pipe 36. Since the rubber gasket 78 is the only element which directly engages the outer surface of the pipe 36, the pipe 36 may tilt slightly with respect to the meter bar 18 without disturbing the gas tight seal therebetween. The lower end of the recess 72 communicates with the side pipe 22 to which the meter bar is threadedly attached.

It is to be noted that our meter bar may be tilted slightly with respect to the axis of either pipe 34 or pipe 36 and that the meter bar may be slid up or down on the ends of these pipes. Because of this fact, the mechanic installing the gas meter may readily position the meter so that its base is horizontal even though the pipes 34 and 36 do not end in exactly the same vertical plane. Furthermore, the meter 18 may be tilted out of a horizontal position to compensate for variations in length between the connections which conect the meter bar with the side pipes of the gas meter whereby the base of the gas meter will be horizontal.

Furthermore, the connections between our improved meter bar and the pipes 34 and 36 provide for possible lengthwise movement of one pipe with respect to the other without injury to the meter bar, since the only result would be that one of the rubber gaskets would slide on its pipe without resulting injury or destruction of the gas tight seal. Any movement of pipe 34 with respect to pipe 36 which would tend to create a pivotal movement of the meter bar around one of these pipes is similarly accommodated by slippage of the rubber gaskets on the pipes. Any movement of pipe 34 relative to pipe 36 which might be due to seasonal temperature variations and which might destroy the parallel relationship of these pipes is also provided for since the connections between the pipes and the meter bar permit tilting movement of the pipes relative to this bar without destruction or injury to the sealed connection therebetween.

Another feature of our invention lies in the fact that the only connection between the meter bar and the pipes 34 and 36 is through rubber gaskets so arranged that the rubber may flow or yield sufficiently to protect the meter against shocks or jars which would otherwise be transmitted to it from the pipes 34 and 36. In this manner the accuracy of the meter is protected and its life materially prolonged.

In Figure 4 we have illustrated a meter bar 18a which is identical with that previously described, except that the same type of connection is used to connect the meter bar with the bent pipes as is used to connect the meter bar with the service and house pipes. In this figure the meter bar 18a has a recess 38a, a bore 42a, tapered surface 44a, rubber gasket 46a, and nut 48a, identical with those previously described in connection with the embodiment of Figure 2. The rubber gasket 46a is the only element contacting with the outer surface of the service pipe 34.

In this embodiment of our invention the upper end of the angular pipe 16a which corresponds to the angular pipe 16 of the previous embodiment need not be threaded. The upper end of this pipe 16a is engaged by the rubber washer 84, clamped between the tapered surface 86 provided by the bar 18a and the nut 88. The bar has a recess 90 for receiving one end of the pipe 16a and a bore 92 through which the pipe extends, both the bore and recess being larger than the outside diameter of the pipe and permitting tilting of this pipe with respect to the bar. The opening 94 in the nut 88 is also larger than the pipe 16a to permit such tilting of the pipe.

It is to be understood that the right-hand end of the bar 18a is attached to the house pipe 36 and the side pipe 22 in the same manner that is used to connect the bar 18 with the house pipe. The right-hand end of the bar is also connected to a bent pipe identical with the bent pipe 16a in the same manner in which the left-hand end of the bar is connected to the pipe 16a. This modification has the additional advantage of permitting more rapid assembly of the bar and meter and provides some additional protection from the meter although under most circumstances such additional protection is not required.

In Figures 5 and 6 we have shown a further modification of our invention wherein the single rigid bar of the previous embodiment is replaced by several elements which conjointly form a meter bar. In this embodiment the member 100 is attached to the service pipe 34 by a coupling identical with that previously used for connecting the meter bar with this service pipe. The member 100 is illustrated as being provided at its lower end with a flange 102 carrying a swiveling nut 104 adapted to be attached to the side pipe 12 of the gas meter, a gasket 106 being interposed between the pipe 12 and member 100 to insure a tight joint. The member 100 provides a conduit connecting the service pipe 34 with the side pipe 12 and this conduit is controlled by a valve 108 having an arm 110 provided with an opening 112 adapted to be placed in alignment with a similar opening 114 formed in a boss 116. It is to be understood that the bolt 118 of a padlock 120 extends through the openings 112 and 114 to lock the valve in position.

The member 100 has an external spherical surface 122 adapted to be gripped between a pair of hemispherical clamps 124 and 126 which are secured together by bolts 128, 130 and 132. The bolts 130 and 132 also pass through a strut 134. The bolts 130 and 132 pass through slots 136 and 138 in the clamps 124 and 126 and thereby permit adjustment of the length of the composite meter bar.

It is to be understood that the right-hand end of the strut 134 is provided with a pair of clamps similar to the clamps 124 and 126 for engaging a second conduit member generally similar to the member 100 and connecting the other side pipe of the gas meter with the house pipe. This second conduit member is also provided with a spherical surface engaged by the clamps, thereby permitting a universal movement between this conduit member and the clamps on the right-hand end of the bar.

The embodiment of Figures 5 and 6 is particularly desirable in that it materially reduces the cost of the installation and the time consumed in making such installation by eliminating the angular pipes 16 and 22 of the prior embodiments. The form of meter bar shown in Figures 5 and 6 may be adjusted in length so that the conduit members at the ends of the bar are in exact alignment with the side pipes of the gas meter. The conduit members can then be attached to the service and house pipes. The universal adjustability between the rigid portion of the meter bar formed by the strut 134 and the clamps at opposite ends thereof and the conduit members engaged by these clamps will protect the side pipes of the gas meter from any strains which would otherwise be imposed thereupon.

Figure 7 illustrates a modification wherein the conduit member 140 is attached to the service pipe 34 by a connection identical with that illustrated in Figure 2. The other end of the conduit member 140 is attached directly to the meter side pipe 12 by means of a swivel connection 142. The conduit member 140 has a spherical portion 144. A second conduit member 146 has one end 148 attached to the house pipe 36 by the same type of coupling which is used for this purpose in Figure 2. The other end of the conduit member 146 threadedly engages a bent pipe 150 connected to the meter side pipe 14 by means of swivel 152. The conduit member 146 also has a spherical portion 154.

The conduit members 140 and 146 are clamped in spaced relation by a pair of straps which are secured together by bolts 158. The ends of the straps are conformed to fit snugly about the spherical portions 144 and 154 of the conduit members. The bent pipe 150, in combination with the angular movement permitted between the straps 156 and conduit members 140 and 146, protect the meter side pipes against strains which would otherwise be imposed thereupon.

In some instances we prefer to connect the meter bar with a meter side pipe by means of a universal connection. Figure 8 illustrates one such connection wherein the meter side pipe 160 has a flat upper end adapted to be engaged by the gasket 162 of rubber or other suitable material attached to a hemispherical member 164 forming a ball-and-socket joint with a socket 168 provided by the lower end of the meter bar 170. A rubber ring 172 forms a gas-tight connection between the member 164 and the socket 168.

The socket 168 also has a spherical upper surface adapted to cooperate with the spherical surface 174 of a tubular nut 176 which secures the bar 170 to the side pipe 160. The nut 176 has an opening 178 materially larger than the neck 180 whereby universal swiveling of the bar with respect to the side pipe 160 is permitted.

In Figure 9 we have shown an extensible bar 182 having a conduit member 184 adapted to be connected to the meter side pipe 186 by a somewhat different universal connection. The side pipe 186 has a flat upper end engaged by a gasket 188 carried by the lower end of the conduit member 184. A flange 190 overlies the gasket 188 and has a spherical upper surface for cooperating with the complementary spherical surface of a tubular nut 192 which secures the conduit member 184 to the meter side pipe 186.

In Figure 10 we have shown a still further type of universal connection between the meter bar 194 and the meter side pipe 196. The upper end of the side pipe 196 is flat and is engaged by a gasket 198 interposed between the side pipe and the spherical lower surface of a flange 200. The flange has a shoulder forming a seat for a split ring 202 providing an upper spherical surface for engaging the complementary spherical surface of a tubular nut 204 which connects the meter bar 194 to the side pipe 196.

In assembling the universal connection shown in Figure 10 the split ring 202 is compressed and placed in the enlarged annular groove provided by the nut 204 where it is permitted to expand. In assembling the split ring 202 and nut 204 on the end of the meter bar the split ring 202 expands sufficiently to permit its passage upwardly over the lower end of the flange 200 and thereafter snaps into the smaller portion of this flange immediately above the shoulder on which the split ring 202 is indicated as resting.

In each of Figures 8, 9 and 10 it is to be understood that the conduit portion of the meter bar is connected to the service pipe 34 by the type of connection illustrated in Figure 2.

While we have illustrated only a few forms of our invention it is to be understood that our invention is not limited to the details shown but may assume numerous other forms and that the scope of our invention is limited solely by the following claim.

We claim:

A meter bar for supporting a gas meter or like delicate instrument and protecting it against strains and vibrations comprising a pair of ends having fluid passageways therein adapted to be connected in fluid-tight relation to a gas meter or like instrument, said passageways having portions adapted to receive service and house pipes therein, flexible gaskets for forming sealed fluid-tight connections between said passageways and said pipes, said flexible gaskets compensating for misalignment of said pipes and forming the only supporting connections between the meter bar and said pipes and protecting the meter or like instrument against damage as a result of vibrations in said pipes, means for holding said gaskets in sealing engagement with said pipes and said ends, and means connecting said ends.

ERNEST G. CAMPBELL.
CHARLES E. NORTON.